Oct. 9, 1951     L. C. STENNING     2,570,880
RADIO BEACON FOR AIRCRAFT

Filed June 21, 1947     3 Sheets-Sheet 1

INVENTOR
LUIS CHARLES STENNING

BY
ATTORNEY

Oct. 9, 1951 — L. C. STENNING — 2,570,880
RADIO BEACON FOR AIRCRAFT
Filed June 21, 1947 — 3 Sheets-Sheet 2

INVENTOR
LUIS CHARLES STENNING
BY
ATTORNEY

Oct. 9, 1951 L. C. STENNING 2,570,880
RADIO BEACON FOR AIRCRAFT
Filed June 21, 1947 3 Sheets-Sheet 3

INVENTOR
LUIS CHARLES STENNING
BY
ATTORNEY

Patented Oct. 9, 1951

2,570,880

UNITED STATES PATENT OFFICE 2,570,880

RADIO BEACON FOR AIRCRAFT

Luis Charles Stenning, Ealing, England, assignor to The General Electric Company, Limited, London, England Application June 21, 1947, Serial No. 756,243
In Great Britain May 10, 1946

Section 1, Public Law 690, August 8, 1946
Patent expires May 10, 1966

9 Claims. (Cl. 343—106)

The present invention relates to radio beacons to assist the marshalling of aircraft.

The capacity of an airfield is dependent upon the number of aircraft which can be landed safely thereon in a given time. The capacity is clearly greater when the intervals between successive landings are equal than when they are irregular, since in the former case the interval can be nearly the minimum safe interval.

It is the principal object of the present invention to provide a radio beacon which enables aircraft to maintain equal intervals when circling during the time immediately preceding landing.

According to the present invention, a radio beacon is arranged to radiate radio-frequency oscillations, the nature of the oscillations and the manner in which they are radiated being such that there is produced, at each of a plurality of positions substantially equally spaced angularly around the beacon, a different identifiable electrical characteristic, means being provided to cause said positions to rotate around the beacon at uniform speed. Each such characteristic may be a predetermined constant phase difference between a reference oscillation of frequency F transmitted from the beacon, and an oscillation derived from an oscillation having an asymmetrical radiation pattern rotated around the beacon at N R. P. M. In this case positions of constant phase-difference may be caused to rotate around the beacon by arranging that the speed of rotation N of the asymmetrical radiation pattern differs slightly from F, or from a frequency equal to F multiplied or divided by a whole number.

The beacon may alternatively be arranged to produce a plurality of substantially uniformly spaced radial lobes, each being modulated, at suitable intervals with a signal representing for example a different letter or numeral constituting the said electrical characteristic. Rotation of the beams will then cause the said positions to rotate.

Aircraft are provided with means for identifying the said characteristics, and when a number of aircraft approach an airfield, their pilots are instructed to maintain such station, in circling the beacon, that a different characteristic is identifiable to each. In this way the aircraft can be maintained circling at a convenient speed properly spaced from one another.

It is desirable that each aircraft should also be provided with means for indicating to the pilot thereof his distance from the beacon. Such means may, for example, consist of a known radar device co-operating with a repeater at the beacon.

Two embodiments of the present invention will now be described by way of example, with reference to the accompanying drawings, in which, Fig. 1 is a diagrammatic sketch of one embodiment, Fig. 2 illustrates the field pattern of oscillations transmitted by the beacon shown in Fig. 1, Fig. 3 is a block diagram of aircraft receiving equipment suitable for use in conjunction with the embodiment of Fig. 1, Fig. 4 shows diagrammatically a display on the screen of a "plan position indicator,"

Figure 1:
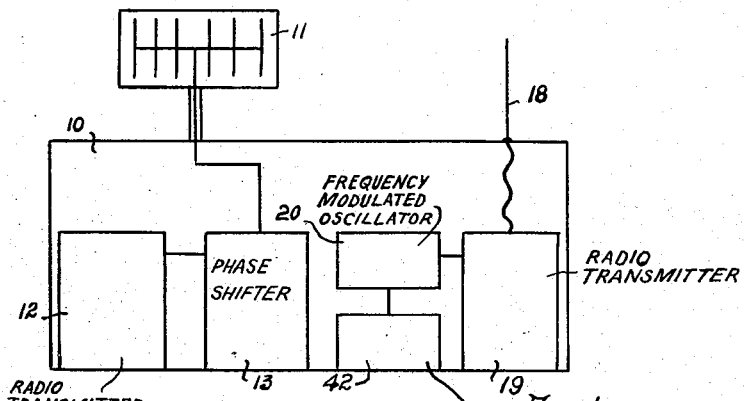

Referring to Fig. 1 a radio beacon 10 comprises a fixed aerial or antenna system of known type shown symbolically at 11 for radiating radio-frequency oscillations having a field pattern to be described later. The aerial system 11 is energised by a transmitter 12, which is coupled to the aerial system through a phase-shifting circuit 13 of known type, which is arranged to feed the output of the transmitter 12 to the aerial system 13 in such a manner that the field pattern of the oscillations radiated by the aerial system rotates at a predetermined uniform speed, say N R. P. M. One example of such a system is one in which the well-known Adcock antenna system is used.

Figure 2:
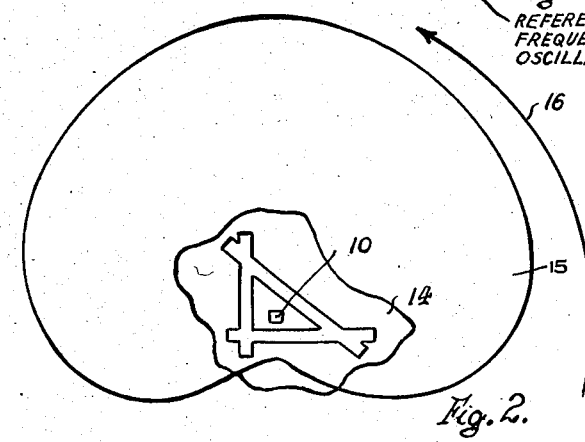

Referring now to Fig. 2, the beacon 10 is shown situated on an airfield 14, and the field pattern of the oscillations transmitted from the beacon is shown to be in the form of a single broad lobe 15 which is asymmetrical about the beacon 10 and is of cardioid shape.

The direction of rotation of the lobe 15 is arranged to be that indicated by the arrow 16, that is to say, looking down on the airfield 14 the field pattern rotates in an anti-clockwise direction.

Thus at a fixed point, say 17, an observer receives a radio-frequency oscillation whose intensity increases and decreases because of the asymmetry of the field pattern and which is therefore amplitude-modulated at a frequency corresponding to the speed of rotation of the lobe 15. Moreover the wave form of the modulation is approximately sinusoidal in view of shape of the lobe 15.

Referring again to Fig. 1, a second radio-frequency oscillation is radiated from an omnidirectional aerial 18 which is energised by means of a transmitter 19. This radio-frequency oscillation is modulated by a frequency-modulated sub-carrier oscillation produced by the frequency modulated oscillator 20. The sub-carrier oscillation is frequency-modulated by an oscillation supplied to the oscillator 20 from the output of a reference frequency oscillator 42. This arrangement is made so that the modulation by the reference frequency is separable from the modulation due to rotation of the lobe 15.

Thus the observer at the point 17 in Fig. 2 (or at any other point around the beacon within suitable range) can now receive two oscillations, one modulated in amplitude at a frequency corresponding to the speed of rotation of the lobe 15, and the other modulated in amplitude by the sub-carrier itself frequency-modulated at the reference frequency.

The frequency corresponding to the speed of rotation of the lobe 15 is made to differ slightly from the reference frequency as will be explained later. In order, however, that the way in which the beacon of the present invention operates may be more readily understood, reference will first be made to a known system in which the frequencies of the two modulation oscillations are equal. Suppose for example that their phase difference is zero along a line running true north from the beacon, then the observer, on moving around the beacon, can ascertain his bearing therefrom by measuring the phase difference, in degrees, between the two modulation oscillations. This arrangement has already been used in what is sometimes known as an omni-directional radio beacon.

Thus, giving an example of the way in which this known beacon may operate, it is assumed that the radio-frequency oscillation radiated by the aerial system 11 has a frequency of 100 mc./s., and that the speed of rotation of the lobe 15 is 30 c./s. Hence without modulation of the 100 mc./s. oscillation at the beacon 10 the observer at the point 17 (Fig. 2) receives this oscillation amplitude—modulated at 30 c./s. owing to the shape of the field pattern. It is assumed that the transmitter 19 has a carrier frequency which is the same as that radiated by the transmitter 12, and in order that the reference frequency may be separated from the modulation due to rotation of the lobe, the carrier is amplitude-modulated by a frequency-modulated sub-carrier of frequency 10 kc./s. from the oscillator 20, the sub-carrier being frequency-modulated at 30 c./s. with a deviation of say ±0.5 kc./s. by a 30 c./s. oscillation from the reference frequency oscillator 42.

Figure 3:
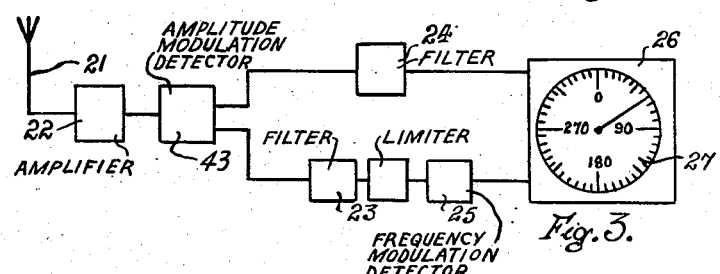

Receiving apparatus of known kind for separating the two modulation oscillations of 30 c./s. and for comparing the phase difference between them, is shown schematically in Fig. 3.

The 100 mc./s. oscillation is received at an aerial 21 and is fed to an amplifier 22 and amplitude modulation detector 43, whose output circuit has two branches one containing a filter 24 arranged to pass only the 30 c./s. modulation and the other containing a filter 44 arranged to pass only the 10 kc./s. sub-carrier. The output of the filter 44 is fed to a limiter 23 and frequency modulation detector 25. Thus the output of the filter 24 is an alternating current at 30 c./s. whose phase is dependent upon the angular position of the receiver relative to the beacon 10, and the output of the detector 25 is an alternating current also at 30 c./s. whose phase is fixed. These two currents are fed to a suitable phase discriminator 26 which compares the phases of the two currents and indicates their phase difference on a scale 27.

This known arrangement has been used in conjunction with the aforesaid omni-directional radio beacon.

In applying the present invention, however, as already mentioned the reference frequency, that is to say the frequency of the oscillator 42, is arranged to differ slightly from the frequency of rotation of the lobe 15. Hence it will be appreciated that a straight line extending from the beacon and corresponding to a line along which the phase difference between the received modulation oscillations is constant, is no longer stationary, but rotates around the beacon at a speed dependent upon the frequency difference between the said two modulation oscillations, and in a direction dependent upon whether the reference frequency is greater or less than the frequency of rotation of the lobe 15.

In this embodiment it will be assumed, for purposes of explanation only, that the frequency of rotation of the lobe 15 is 30 c./s. and that the frequency of the reference oscillation is 30−1/1440 cycles per second. Hence any point of constant phase difference between the two modulation oscillations rotates around the beacon once every 1440 seconds or twenty-four minutes and in an anti-clockwise direction looking from above the beacon. The aforesaid different identifiable characteristics in this example take the form of predetermined phase differences. Although there are an infinite number of such characteristics, only a relatively small number will usually be required. Thus they may be assumed to be spaced at intervals of 30°, giving a total of twelve identifiable characteristics namely phase differences of 0°, 30°, 60°, 90° and so on to 360°.

The pilot of each aircraft arriving at the airfield is instructed to fly his aircraft at a predetermined radius, say ten miles, and to maintain such station as to produce an indication of one of the characteristics listed above. In this case the pilot would have to fly his aircraft at a speed of approximately 150 M. P. H. An indication of phase difference lower than that at which he is instructed to fly indicates that he must either increase speed, or decrease his radius of flight, or both, temporarily, the converse being the case should an indication be given which is in excess of that required.

Each pilot is given a different value of phase difference to maintain and hence aircraft can be kept circling at suitable spacing.

Figure 4:
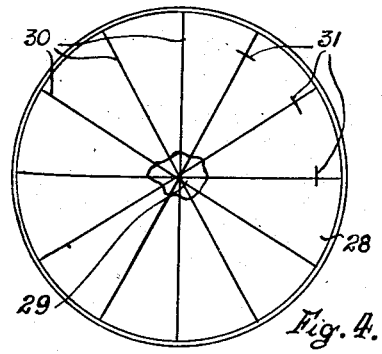

A person on the airfield, controlling the marshalling of aircraft, is preferably provided with a "plan position indicator" as shown in Fig. 4, in which the face 28 of a cathode ray tube has marked on the centre thereof a plan 29 of the airfield 14 shown in Fig. 2. A radial time base having, say, twelve equally spaced arms 30 corresponding to lines of constant phase difference separated by 30° intervals, is arranged to rotate at a speed of one revolution every twenty-four minutes, and by known radar means an indication 31 of the position of each aircraft circling the airfield is formed on the screen of the tube. With this arrangement an airfield controller can readily ascertain the position of each aircraft circling the airfield.

It will be realised that the beacon may be used by making the frequency of the reference oscillation differ slightly from a frequency which is equal to 30 c./s. divided or multiplied by a whole number. In this case there may be provided in the aircraft suitable frequency multiplier or divider equipment as appropriate, in order to provide alternating currents of suitable frequency difference for application to the phase discriminator 26.

Figure 8:
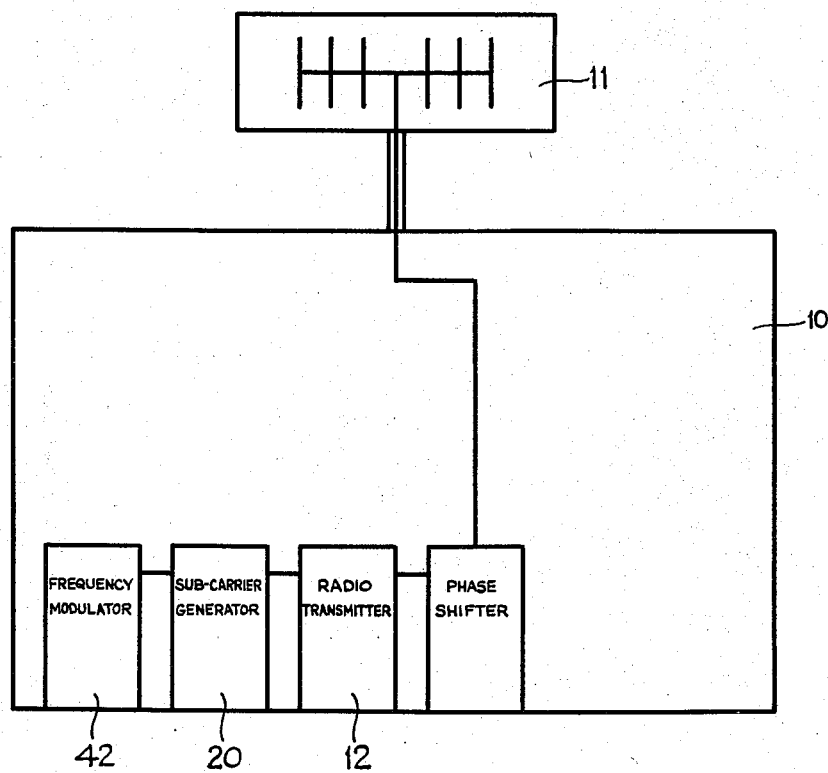
Fig. 8 is a block diagram of still another embodiment.

Since the carrier frequency of the transmitter 19 is in this example the same as that of the transmitter 12 and if the shape of the field pattern 15 (Fig. 2) is such that sufficient field strength is obtainable continuously at all points around the beacon, the separate transmitter 19 and omni-directional aerial 18 may be dispensed with as shown in Figure 8 and the frequency modulated oscillator 20 and reference frequency oscillator 42 coupled with the transmitter 12. Any other arrangement for transmitting the field pattern 15 and the reference oscillation may be used provided that they can be picked up and separated from one another at a receiver.

Figure 5:
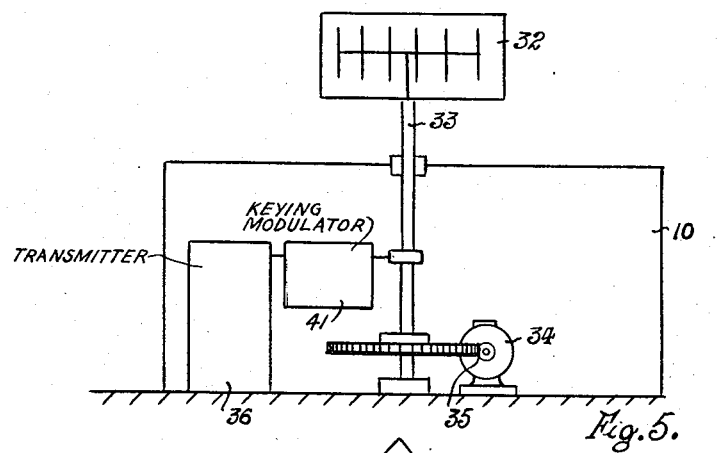
Fig. 5 is a block diagram of a second embodiment.

Referring now to Fig. 5, this shows diagrammatically a second embodiment of the invention. The beacon 10 comprises a suitable aerial system represented symbolically at 32 rotatably mounted by means of a shaft 33 arranged to rotate at a suitable speed, say one revolution every twenty four minutes, by means of a motor 34 coupled to the shaft 33 through a worm drive 35. The aerial system 32 is energised by a transmitter 36 through a keying modulator 41 of known form whose function is described hereinafter with reference to Figure 7.

Figure 6:
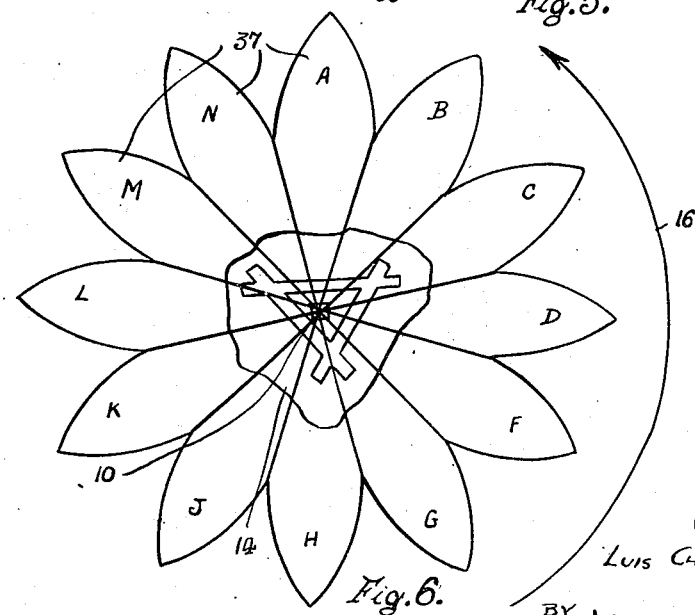
Fig. 6 shows the field pattern of oscillation radiated from an aerial system shown in Fig. 5.

The field pattern of radio-frequency oscillations radiated from the aerial system 32 is arranged in known manner to be as shown in Fig. 6, and consists of twelve equally spaced lobes 37. Because of the rotation of the aerial system 32, these lobes rotate in an anti-clockwise direction as indicated by the arrow 16 and at the rate of one revolution every twenty four minutes.

Figure 7:
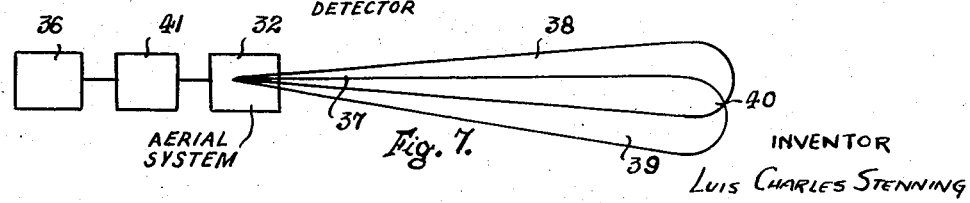
Fig. 7 illustrates the manner in which a lobe shown in Fig. 6 may be switched.

The oscillations in the lobes 37 are modulated at frequent intervals as hereinafter described with reference to Figure 7, with a different identifiable characteristic in the form of signals representative of for example letters as shown on the lobes.

Modulations, other than the characteristics by which the lobes may be identified, are preferably provided whereby the pilot of an aircraft can ascertain whether he is in the centre of a lobe or towards its leading or trailing edge.

Both modulations may be provided, for example, as will be described with reference to Figure 7 as well as Figure 5. Each lobe 37 is arranged to be swung to and fro between two positions 38 and 39 which overlap over a central region 40. The oscillations from the transmitter 36 are fed to the aerial system 32 through a known type of modulator 41, which modulates the lobe differently when it is in the position 38 from when it is in the position 39, the two modulations, however, tending to form a continuous tone in the central part of the region 40, which will be referred to as the equi-signal zone. For example, the transmitted oscillations may be amplitude-modulated with an audible tone, the oscillations in the lobe position 38 being keyed to transmit dots at the rate of one per second each dot having a duration of ⅛ second, the oscillations in the lobe position 39 being keyed to transmit dashes at the rate of one per second, each dash having a duration of ⅞ second, and the ⅛ second intervals between dashes being arranged to coincide with the ⅛ second dots. A continuous tone is then produced in the equi-signal zone near the centre line of the region 40. In order to transmit the identifiable characteristics, the transmission of dots and dashes may be interrupted at suitable intervals and the appropriate letter transmitted by keying the radiated oscillations with the appropriate Morse signal.

In using the beacon, the pilot of an aircraft provided with a suitable receiver is instructed to maintain station in a particular lobe, and to fly at a predetermined radius, say ten miles as in the previous case. In order to do this his speed will be approximately 150 M. P. H. as before. Should the pilot receive a preponderance of dots or dashes whilst flying around the beacon, then he will increase or decrease his speed, or radius of flight, or both, as appropriate in order to bring him back once more into the equi-signal zone.

Thus aircraft are given indications of the correct stations to be maintained whilst circling the airfield, and mooreover when using a beacon as just described an aircraft may use one channel of a communications receiver already installed in the aircraft, thereby obviating the necessity of special equipment for receiving beacon signals.

I claim:

1. In a radio beacon, means for radiating energy having a rotating directional radiation pattern, and means for modulating the radiated energy to provide at least three different identifiable electrical characteristics at positions spaced angularly around the beacon, said characteristics rotating with said radiation pattern.

2. A radio beacon comprising an antenna system for radiating a radio-frequency oscillation having a field pattern containing at least one lobe asymmetrical about the beacon, transmitter means for energising said antenna system, rotation means for rotating said pattern at a speed corresponding to N cycles per second, and modulation means for modulating said radio-frequency oscillation to provide at a plurality of points around said beacon, independent of the rotation of said field pattern, a radio field defining a reference oscillation having a frequency F which differs from N, whereby there are produced in the form of constant phase differences a plurality of identifiable electrical characteristics at positions substantially equally spaced angularly around the beacon and rotating around the beacon.

3. A radio beacon comprising an antenna system for radiating a radio-frequency oscillation having a field pattern containing at least one lobe asymmetrical about the beacon, transmitter means for energising said antenna system, rotation means for rotating said pattern at a speed corresponding to N cycles per second and modulation means for modulating said radio-frequency oscillation to provide at a plurality of points around said beacon, independent of the rotation of said field pattern, a radio field defining a reference oscillation having a frequency F which differs from N divided by a whole number, whereby there are produced in the form of constant phase differences a plurality of identifiable electrical characteristics at positions substantially equally spaced angularly around the beacon and rotating around the beacon.

4. A radio beacon comprising an antenna system for radiating a radio-frequency oscillation having a field pattern containing at least one lobe asymmetrical about the beacon, transmitter means for energising said antenna system, rotation means for rotating said pattern at a speed corresponding to N cycles per second and modulation means for modulating said radio-frequency oscillation to provide at a plurality of points around said beacon, independent of the rotation of said field pattern, a radio field defining a reference oscillation having a frequency F which differs from N multiplied by a whole number.

5. A radio beacon comprising an antenna system for radiating a radio-frequency oscillation having a field pattern containing at least one lobe asymmetrical about the beacon, transmitter means for energising said antenna system, rotation means for rotating said pattern at a speed corresponding to N cycles per second, an antenna for radiating a radio-frequency oscillation having an omnidirectional field pattern, and means for modulating the last said radio-frequency oscillation with a reference oscillation having a frequency F which differs from N, whereby there are produced in the form of constant phase differences a plurality of identifiable electrical characteristics at positions substantially equally spaced angularly around the beacon and rotating around the beacon.

6. A radio beacon comprising an antenna system for radiating a radio-frequency oscillation having a field pattern containing at least one lobe asymmetrical about the beacon, transmitter means for energising said antenna system, rotation means for rotating said pattern at a speed corresponding to N cycles per second, and modulation means for modulating said radio-frequency oscillation with a reference oscillation having a frequency F which differs from N, whereby there are produced in the form of constant phase differences a plurality of identifiable electrical characteristics at positions substantially equally spaced angularly around the beacon and rotating around the beacon.

7. A radio beacon comprising an antenna system for radiating a radio-frequency oscillation having a field pattern containing at least one lobe asymmetrical about the beacon, transmitter means for energising said antenna system, rotation means for rotating said pattern at a speed corresponding to N cycles per second, modulation means for modulating said radio-frequency oscillation with a sub-carrier and means for modulating said sub-carrier with a reference oscillation having a frequency F which differs from N, whereby there are produced in the form of constant phase differences a plurality of identifiable electrical characteristics at positions substantially equally spaced angularly around the beacon and rotating around the beacon.

8. A radio beacon, comprising an antenna system for radiating radio-frequency oscillations having a field pattern containing a plurality of substantially equally spaced radial lobes, transmitter means for energising said antenna system, rotation means for rotating said pattern, and modulation means for modulating the oscillations in each of said lobes with a different identifiable characteristic, whereby each said identifiable characteristic rotates around said beacon with one of said lobes.

9. A radio beacon comprising an antenna system for radiating radio-frequency oscillations having a field pattern containing a plurality of substantially equally spaced radial lobes, transmitter means for energising said antenna system, rotation means for rotating said pattern, modulation means for modulating the oscillations in each of said lobes with a different identifiable characteristic, whereby each said identifiable characteristic rotates around said beacon with one of said lobes, and additional modulation means for producing additional characteristics indicating a central, a leading and a trailing zone of each lobe.

LUIS CHARLES STENNING.

REFERENCES CITED

The following references are of record in the file of this patent:

UNITED STATES PATENTS

| Number | Name | Date |
| --- | --- | --- |
| 833,034 | De Forest | Oct. 9, 1906 |
| 1,815,246 | Englund | July 21, 1931 |
| 1,988,006 | Greig | Jan. 15, 1935 |
| 2,141,282 | Southworth | Dec. 27, 1938 |
| 2,210,651 | Busignies | Aug. 6, 1940 |
| 2,252,699 | Byrne | Aug. 19, 1941 |
| 2,257,320 | Williams | Sept. 30, 1941 |
| 2,368,318 | Muler | Jan. 30, 1945 |
| 2,377,902 | Relson | June 12, 1945 |
| 2,422,110 | Luck | June 10, 1947 |

FOREIGN PATENTS

| Number | Country | Date |
| --- | --- | --- |
| 161,448 | Great Britain | Apr. 14, 1921 |